March 26, 1968 G. B. FINN, JR 3,375,415

HIGH CURRENT RECTIFIER

Filed July 17, 1964 3 Sheets-Sheet 1

INVENTOR.
George B. Finn Jr.

BY Mueller & Aichele

ATT'YS.

March 26, 1968 G. B. FINN, JR 3,375,415

HIGH CURRENT RECTIFIER

Filed July 17, 1964 3 Sheets-Sheet 2

INVENTOR.
George B. Finn Jr.

BY Mueller & Aichele

ATT'YS.

INVENTOR.
George B. Finn Jr.
BY Mueller & Aichele
ATT'YS.

United States Patent Office 3,375,415
Patented Mar. 26, 1968

3,375,415

HIGH CURRENT RECTIFIER

George B. Finn, Jr., Scottsdale, Ariz., assignor to Motorola, Inc., Franklin Park, Ill., a corporation of Illinois Filed July 17, 1964, Ser. No. 383,429
5 Claims. (Cl. 317—234)

This invention relates to the semiconductor art and in particular to a very high current rectifier.

There are two basic methods of making high current rectifiers. One method uses a large single rectifier junction to carry the required current (as the current requirements are increased, these single junctions must become larger and larger), and the second method is to parallel a number of low current rectifiers.

In the past, the manufacture of high current rectifiers has proceeded with the large single junction method because of the difficulty of accomplishing equal current distribution through parallel rectifiers without the use of external paralleling components, and although the cost of large junction rectifiers is quite high, the cost of making such a device using parallel low current rectifiers was even greater than with the single junction approach.

There are a large number of problems associated with large single junction rectifiers which make them far from being the ideal elements for high current rectifiers. Large area rectifier junctions cannot be made without some imperfections, and the larger the area for higher current capability, the larger the number of imperfections. Moreover, even though they are referred to as being large single junctions, they may be considered as consisting of many small junction areas, good and bad, connected in parallel.

The voltage drop across all of the "small junction areas" is not exactly the same and, therefore, some areas will assume more than their normal share of current. These high current areas may become overheated leading to thermal fatigure and device deterioration. Also, these thermally stressed areas and other imperfection regions tend to assume most of the excess current on surges which may lead to the destruction of the rectifier. This tendency therefore has the effect too of imposing a practical limit on the current and surge capability of these devices since to make very heavy duty devices of the single junction type, very large and nearly perfect junctions are required and these are almost prohibitively expensive to make.

In the second method, rather than using a large junction, a number of small junctions are connected as a unit in parallel to provide a rectifier of practically any desired total current rating. Breaking up the large rectifier junctions into many small rectifier junctions permits the selection of the near perfect which may then be paralleled to form a total "junction" with more ideal characteristics and greater capabilities.

The basic objection to the use of multiple paralleled junctions is in the difficulty of attaining equal current distribution. For this reason it is necessary to match the forward voltage characteristics of each of the junctions to within just the few millivolts at currents as high as one-hundred or more amperes. Further, since semiconductor junctions are temperature sensitive with respect to their current carrying characteristics, it is a necessary characteristic of each junction that it can be maintained at substantially the same temperature as each other junction. This is in order that the temperature difference between any of the junctions may be made so small that any resulting current unbalance is negligible.

As is well-known, the PN junctions of semiconductor devices are quite apt to change in their characteristics as a result of various assembly operations such as soldering of the semiconductor material and encapsulating it so that it becomes desirable to perform these operations prior to selecting the junctions. This is conveniently done by assembling each junction into a substantially complete rectifier, hereinafter referred to as a unit cell.

When the above requirements are met, the paralleled junctions concept has several advantages:

(1) The entire group of junctions can be factory tested to a set of specifications prior to a final assembly and non-specification junctions can be eliminated so that the finished device can be to any desired level of quality or performance.

(2) One or more reserve junctions can easily be built in to provide an extra current margin, and if a junction happens to open circuit under temporary overload, the rectifier will continue to function.

Despite its advantages, the paralleled junctions concept has not become popular for the reason that it was apparent that extremely efficient large volume production methods had to be developed to make the large quantities of rectifier unit cells necessary just to provide a statistically large enough supply from which properly matched cells could be selected. To provide an efficient high production capability, the design of the unit cell must itself be quite efficient and producible in order to bring individual unit cell cost down to a practical figure for such application. Without such manufacturing capability, it is not economically practical to select and use unit cells with such closely matched electrical characteristics even though available.

The principal object of this invention is to provide a high current paralleled junction type rectifier which may be manufactured at less cost than equivalent single junction high current rectifiers.

Another object of this inveniton is to provide a means of making rectifiers of a considerably higher current and surge capability than would be possible with state-of-the-art single junction devices.

The primary feature of this invention is a basic high current rectifier design which provides an inexpensive means of making rectifiers of higher current and surge capability than prior art rectifiers.

A feature of this invention is the method of assembly of the rectifier which includes carefully and thoroughly selecting and matching unit cells, and connecting them in parallel on a heavy base in a manner that their characteristics are preserved.

Another feature of this invention is a unit cell design that provides operationally all that is required in a unit cell yet is easily and inexpensively manufactured.

High current rectifiers in accordance with this invention are manufactured by first fabricating a very large quantity of rectifier unit cells and sorting them into closely matched groups. Unit cells from within each group are then assembled together with component piece parts to form a high current rectifier.

Figure 1:
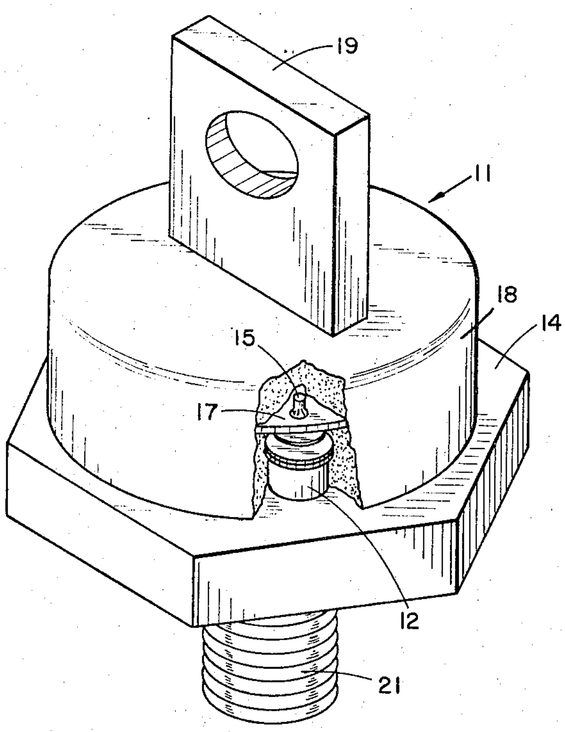
FIG. 1 is an isometric view of a high current rectifier with a portion cut away to show one of the several unit cells used in the device.

The high current rectifier 11 shown in the cutaway view of FIG. 1 is such an embodiment of this invention.

The rectifier 11 is comprised of a number of rectifying unit cells 12 which are paralleled by soldering their metal housings to a large copper base 14 and by connecting the wire terminal portions 15 of the unit cells 12 to a copper connector plate 17. The cells 12 and plate 17 are surrounded by a plastic potting compound 18. The heavy copper terminal 19 braised to the copper connector plate 17 serves as one connection of the rectifier, while the base 14 is the other. The threaded stud 21 of the base 14 is for mounting purposes and provides a means for pulling the copper base tightly against a heat sink (not shown) to provide good thermal contact. Optionally, the base may be provided with holes for mounting with screws or bolts.

Figure 2:
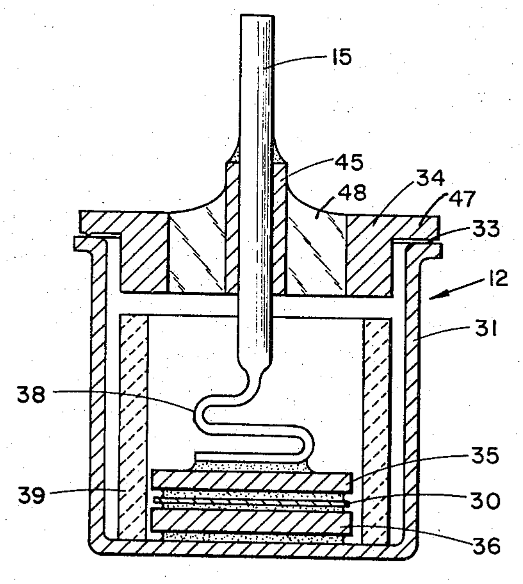
FIG. 2 is a sectional view of a rectifier unit cell.

FIG. 2 is a cross-sectional view of a unit cell 12. The unit cell is comprised of a silicon rectifier die 30 electrically connected to a steel cap 31, within which it is hermetically sealed, and a copper wire terminal 15. The wire terminal 15 is electrically and physically isolated from the cap by the glass-to-metal lead-through 34 to which the cap 31 is welded and the wire 15 is soldered. As shown in FIG. 2, the glass-to-metal lead-through 34 has a metal tubulation 45 and a metal flange 47 interconnected by an insulating ring 48. The die 30 is soldered between two copper disks 35 and 36. The S-bend portion 38 of the wire terminal 15 is soldered to the upper disk 35 and the lower disk 36 is soldered to the steel cap 31. The two copper disks 35 and 36 act as thermal accumulators to reduce the heating effect of sudden power surges. The thermal capacitance of copper and the mass of the disks are such that substantial power is required to obtain only a moderate increase in the temperature of the copper which is not the case with silicon. The thermal conductivity of copper is quite high so by placing the copper disks against the faces of the silicon, the silicon will not heat up greatly under a power surge as the heat flows away quite rapidly into the copper disks which rise only slightly in temperature. The heat developed during the surge flows away from the disks 35 and 36 through the can 31 and copper base 14 (FIG. 1) into whatever heat sink the device 11 is connected.

To obtain an equivalent unit cell without the copper disks, a heavy gage copper can would have to be used instead of the steel can. A suitable copper can is several times more expensive initially and in addition its use would require the addition of at least two more piece parts per unit cell and several additional assembly operations in order to properly accomplish the required hermetic sealing of the unit cell.

A stabilized environment for the silicon die 30 is provided within the unit cell by a hollow cylinder 39 of the highly absorbent material sodium aluminum silicate and/or calcium aluminum silicate. This material absorbs gaseous materials from any outgassing of any of the glass or metal parts and maintains the atmosphere within the unit cell at a substantially constant moisture level.

Figure 3:
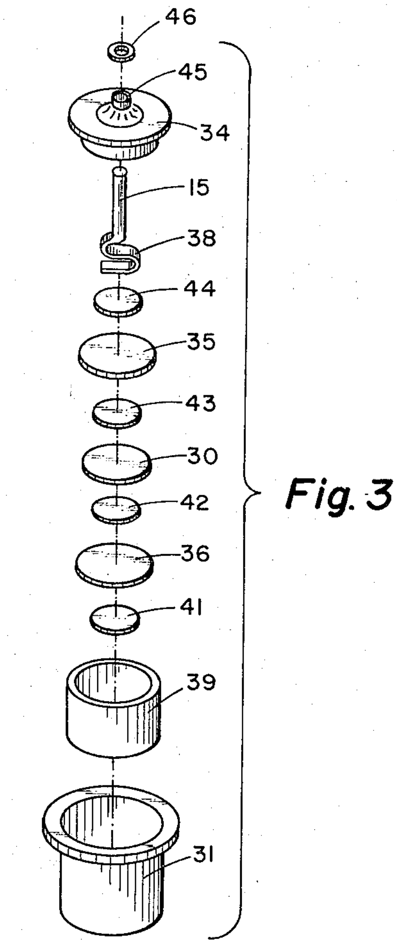
FIG. 3 shows an exploded view of a rectifier unit cell.
Figure 4:
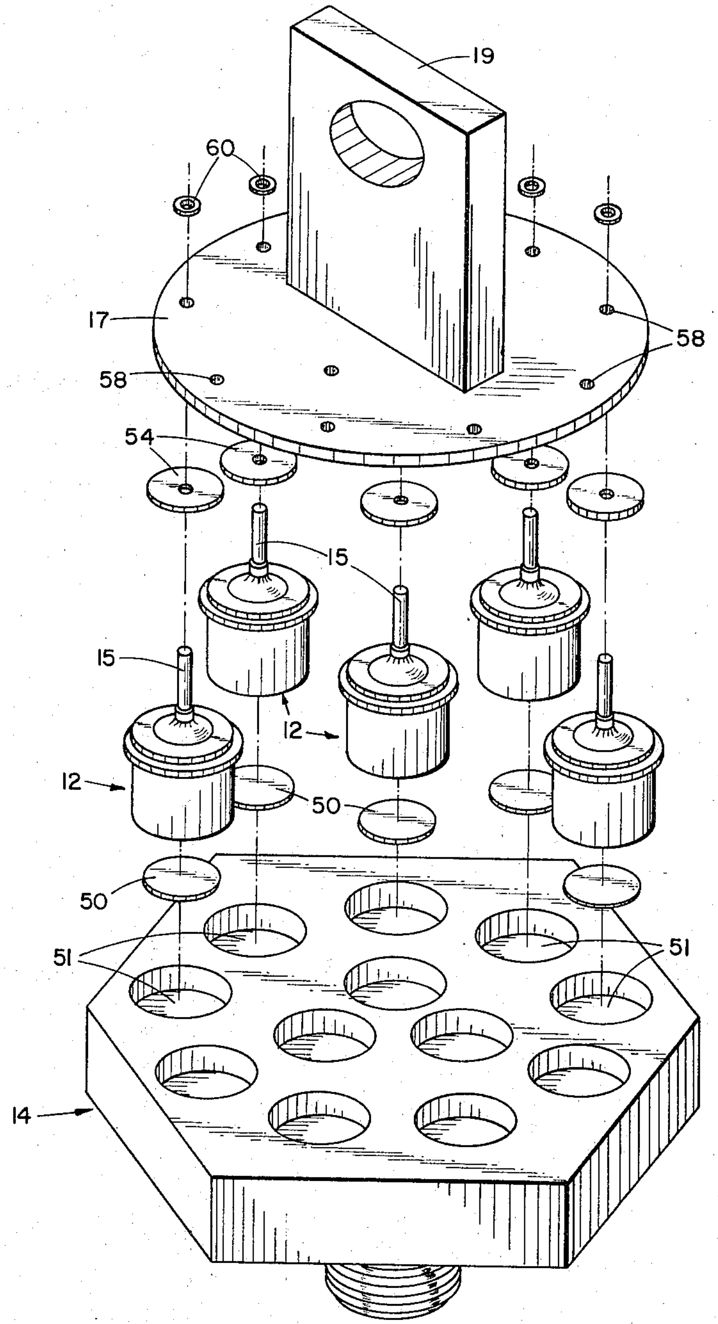
FIG. 4 shows an exploded view of the high current rectifier.

The exploded views of FIGS. 3 and 4 are provided to facilitate the description of the method of assembly of the device. The unit cell 12 is, of course, assembled first. The preparation of unit cells begins (FIG. 2) with the fabrication and selection of large quantities of silicon dice 30. The dice are of the diffused junction type with gold-over-nickel metallization on the die faces. The methods of fabricating metallized dice of this type are well-known to the semiconductor industry. The selection of these dice includes testing them for rectification characteristics, physical dimensions and discarding those which do not meet minimum specifications.

To reduce assembly cost, the design of the unit cell is such that each die and other components may be easily loaded into the cap 31 and cylinder 39 which serve somewhat as assembly jigs. Further, most of the piece parts except for the die, cylinder and the lead-through are inexpensive punch press parts of the simplest and most easily assembled shapes consistent with device operation requirements. Where possible fits between parts are made quite loose to facilitate assembly.

The cap 31 is of copper plated steel. Into the cap is first placed a pressed hollow cylinder 39 of sodium aluminum silicate. Into the cylinder 39 are placed in sequence a solder disk 41, the copper disk 36, a solder disk 42, the silicon die 30, a solder disk 43, the copper disk 35, and another solder disk 44. The wire terminal 15 which is equipped with an S-bend 38 is threaded through the metal tubulation 45 of the glass-to-metal lead-through 34. The small solder ring 46 is then placed over the lead and then the subassembly consisting of the wire terminal 15, lead-through 34 and solder ring 46 are placed upon the cap 31 so that the S-bend 38 is within the cylinder 39 and rests upon the top solder disk 44. The resulting subassembly is then placed on a conveyor belt and passed through a soldering furnace having a hydrogen atmosphere; all connections, of which there are five, are soldered at once by heating the subassembly for a few minutes to a temperature of 465° C. Because of the slightly reducing atmosphere of the furnace, no fluxes are required in the soldering operation. The solder used in the solder disks 41, 42, 43, 44 and the ring 46 have the composition 2.5% silver, 5.0% indium with the remainder lead. They were chosen for superior wetting ability during soldering and their excellent resistance to thermal and mechanical fatigue.

During the soldering operation, the first copper disk 36 is soldered to the cap 31 and to the lower face of the silicon die 30; the second copper disk 35 is soldered to the upper face of the silicon die and to the S-bend portion of the lead. The lead is soldered to the tubulation 45 of the lead-through, completely sealing off the tubulation. The soldered unit cell assembly is then transferred to a welder where the annular welding projection 33 of the flange 47 of the lead-through 34 is welded to the cap 31 thereby hermetically sealing the unit cell. The wire terminal 15 which is soldered to the tubulation of the lead-through is forced toward the copper disks 35 and 36 and die 30 as a result of the welding, however, this motion is absorbed by the S-bend 38 which is sufficiently resilient so that the die is not unduly strained. Except for testing, this completes the assembly of the unit cell.

The unit cells 12 are then tested and grouped according to their forward voltage characteristics, i.e., they are matched to within 20 millivolts at 100 amperes. They are also selected to meet minimum specifications with respect to leakage and thermal characteristics such as the junction temperature rise per unit of power dissipated.

Activated rosin soldering flux and solder disks 50 (FIG. 4) are placed in the recesses 51 of the copper base 14 and then rectifier unit cells 12 from a given group are placed in these recesses 51 so that each cap 31 rests upon the solder preform 50. When all the unit cells 12 are in position in the recesses 51 in the base 14, an insulating spacer 54 is placed over the wire terminals 15 of the unit cells and then the connector plate 17 with a terminal lug 19 are placed in position so that the wires 15 of the unit cells 12 extend through the perforations 58 of the connector plate 17. In this position, the connector plate 17 will rest on the insulator spacers 54. A small solder ring 60 with a little activated rosin flux is placed over each wire terminal 15 to complete the assembly before soldering.

As previously indicated, it is most desirable that each unit cell in the rectifier (FIG. 1) have the same thermal characteristics. Although the unit cells are preselected to have the same thermal characteristics before final assembly, it is necessary to preserve these characteristics so that after assembly the thermal connection between each unit cell and the copper base be of a uniformly high quality so as to introduce as little thermal resistance between each unit cell and whatever heat sink is provided for the base to be fastened. Toward this end a coined rather than machined copper base is used, so that a recess having a very smooth surface is provided to give maximum contact between the can and the base (the coined base is also several times less expensive than a machined base and so further reduces rectifier cost). An activated rosin soldering flux is used in the recesses 51 so that the solder film between the can 31 and the base 14 will be as thin and uniform as is practical. Solder has a rather low thermal conductivity which tends to magnify the effect of minor thermal differences between unit cells; however, when each solder film is thin and uniform, this tendency is negligible.

The solder disks 50 and rings 60 are of an alloy designed to solder at a substantially lower temperature than those used in the unit cell. The alloy which is 3.5% silver, 96.5% tin is a eutectic solder and has a melting temperature of 221° C.

The assembly is placed on a conveyor belt and passed through a soldering furnace where it is soldered at a temperature of 230° C. in a nitrogen atmosphere. The soldering temperature was chosen to be well below the soldering temperature and the softening point of solders used in the unit cell, in order that the unit cells are undisturbed in characteristic by this operation thus insuring that the closely matched unit cells remain that way. The use of the flux is not in any way undesirable in this particular soldering operation since all of the sensitive semiconductor units are hermetically sealed within the housing of the unit cell.

Figure 5:
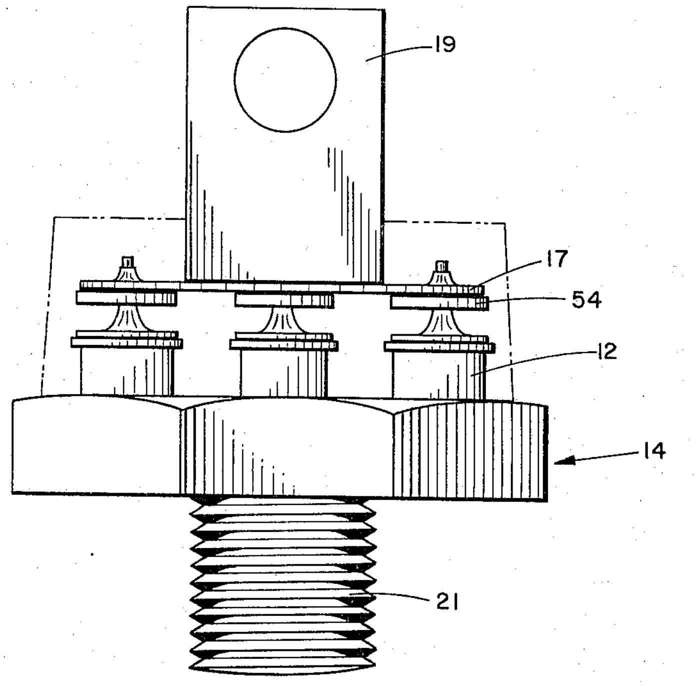
FIG. 5 shows a completed high current rectifier assembly ready for potting with the plastic encapsulating composition.

The assembly after soldering is shown in FIG. 5. The device, except for testing, is completed with a degreasing step which also removes any flux residues, a nickel plate, and by molding a plastic potting compound 18 such as an epoxy resin about the assembly within the dashed lines to form an encapsulation as shown in FIG. 1.

A high current rectifier in accordance with this invention is quite inexpensive to manufacture as piece part cost is low and very little labor is required in assembling either the unit cell 12 or the larger rectifier 11 having the copper base 14. The cap 31 and cylinder 39 act much as assembly and locating jigs as does the recessed base 14. Of the various parts which are assembled, most have the form of free fitting disks and cylinders so that assemblers have for the most part only gross positioning and placement operations to perform. The recesses in the base 14 serve a further assembly function and so position the wire terminals 15 that the connector plate 17 is easily slipped over the wires 15 (FIG. 1).

As the unit cells are preselected for quality and are not altered in any way during the final soldering operation to form the multiple unit cell rectifier assembly or in the final potting operation, the production yields are nearly 100% which is several times larger than typical yields of large area junction rectifiers.

The combination of low assembly cost and extremely high yields provide a high current rectifier which is much less expensive than comparable single junction high current rectifiers. Although large single junction rectifiers are not particularly difficult to assemble, the production yields are characteristically very low. The components used in them such as the large seals and large dice are sufficiently expensive that the total cost of rejected units is quite high. Since this cost must be borne as a manufacturing charge against good devices, good single junction high current rectifiers are very expensive especially as compared to devices in accordance with this invention. In manufacture according to this invention, even the yield of the unit cells approaches 100% due to the fact that small dice are used which are many times more likely to be good initially and much less apt to be damaged in manufacture.

The embodiment shown, which is a 240 ampere rectifier, is comprised of eleven 25 ampere unit cells. Redundancy is provided as only ten cells are required, the extra or reserve cells are built-in to provide an extra current margin so should one cell open under an extremely severe temporary surge condition, the assembly can continue to function.

Higher current devices than the 240 ampere devices may be provided by simply using a larger base with more recesses and adding more unit cells.

Devices for use at currents above 1000 amperes are being routinely produced in accordance with this invention as are smaller current devices having as few as two unit cells in parallel. For some applications, a single unit cell is soldered into a copper base having a single recess.

Units made in accordance with this invention are quite reliable; the failure percentage of unit cells being less than .005%. The surge capability of high current rectifiers made in accordance with this invention is excellent. Tests conducted on 400 ampere rectifiers verify that the current does not concentrate in just a few of the individual cells. The devices were tested under the following conditions:

| | | |
|---|---|---|
| Frequency | kilocycles | 1 |
| Surge duration | microseconds | 500 |
| Surge | amperes | 40,000 |

This surge was repeated six times on each device without incident verifying that the devices are able to withstand very large surges without failure. This constitutes a substantial improvement over state-of-the-art single junction rectifiers and is due to the fact that the unit cells are so well matched that the current through the devices divides evenly. The unit cell used in the high current rectifiers, is singly and in combination capable of being utilized to fill most rectification applications. High current rectifiers using these cells, and which are in accordance with this invention can provide:

(1) Increased current-handling capability in commercial rectifiers from the present maximum limit of considerably less than one-half kiloampere to well over a kiloampere and increased surge capability several times that of presently commercially available devices.

(2) An appreciable reduction in the present cost of such devices.

(3) An extra margin of equipment reliability due to built-in redundancy.

What is claimed is:

1. A semiconductor rectifier comprising a plurality of matched unit cells, said unit cells each having for electrical connections a cap and an extending wire terminal, a metal base with a plurality of recesses into which are soldered said caps of said unit cells, said metal base equipped with a mounting means to facilitate making electrical and thermal connection to said base, a metal connector with apertures respectively aligned with said recesses and into which are soldered said wire terminals, and a terminal means other than the said wire terminals of said unit cells attached to said connector for making electrical connection to said connector.

2. A semiconductor rectifier device including in combination, a plurality of matched cells each having a cap and a wire terminal forming electrical connections thereto, a metal base with a plurality of recesses for receiving said caps of said cells, means electrically and thermally connecting said caps to said base, said metal base having mounting means to facilitate making electrical and thermal connection to said base, a metal connector with apertures therein aligned with said recesses for receiving said wire terminals, means for electrically connecting said wire terminals to said connector, terminal means attached to said connector for making electrical connection thereto, and insulating potting material about said cells and said conductor.

3. A semiconductor rectifier device including in combination, a plurality of matched cells, each of said cells including a conducting cap having therein a semiconductor die having first and second opposite die faces, first and second copper disks on opposite sides of said die and each having first and second faces, said first faces of said first and second disks being soldered to said first and second faces of said die respectively, said cap having a flat closed end and an open end having a flanged portion, said second face of said first copper disk being soldered to said flat closed end of said cap, a lead-through having a flange, a tubulation and insulating material separating said flange from said tubulation, a wire terminal extending through said tubulation and soldered to said second face of said second copper disk, said flange being welded to said flanged portion of said cap and said tubulation being soldered to said wire terminal thereby forming a sealed enclosure about said semiconductor die unit, and a hollow cylinder of an environment stabilizing material within said enclosure about said die and said disks, a metal base with a plurality of recesses for receiving said caps of said plurality of cells, means electrically and thermally connecting said caps to said base, said metal base having mounting means to facilitate making electrical and thermal connection to said base, a metal connector with apertures respectively aligned with said recesses therein for receiving said wire terminals of said cells, and means for electrically connecting said wire terminals to said connector, said connector having a terminal for making electrical connection therto.

4. A rectifier device, including in combination, a metal base having a plurality of recesses, a like plurality of rectifier cells each having a cap terminal and a wire terminal coaxially extending away from said cap terminal and selected to have the same thermal characteristics, said cap terminals respectively disposed in said recesses in electrical and thermal connection to said base with said wire terminals extending away from said base, and a unitary metal connector having a like plurality of apertures coaxially aligned with said recesses, each aperture being aligned with and receiving one of said wire terminals and being in electrical and mechanical connection therewith.

5. The rectifier device of claim 4 further including a like plurality of insulating spacers respectively disposed about said wire terminals and in supporting relation to said connector.

References Cited

UNITED STATES PATENTS

| | | | |
|---|---|---|---|
| 2,745,044 | 5/1956 | Lingel | 317—234 |
| 2,780,757 | 2/1957 | Thornhill et al. | 317—234 |
| 3,176,382 | 4/1965 | Dickson et al. | 29—155 |
| 3,199,004 | 8/1965 | Dickson | 317—240 |
| 3,218,524 | 11/1965 | Reintgen et al. | 317—234 |
| 3,226,603 | 12/1965 | Finn et al. | 317—101 |
| 3,231,794 | 1/1966 | Diebold | 317—234 |
| 3,257,621 | 6/1966 | Jadoul | 330—23 |

JOHN W. HUCKERT, *Primary Examiner.*

R. SANDLER, *Assistant Examiner.*